United States Patent [19]

Podesva et al.

[11] 3,821,221
[45] June 28, 1974

[54] 1,2,3,6-TETRAHYDROPYRIMIDINE-2-ONE COMPOUNDS AND PROCESSES FOR MAKING THEM

[75] Inventors: Ctirad Podesva; Jose Maria Do Nascimento, both of Montreal, Quebec, Canada

[73] Assignee: Delmar Chemicals Limited, Ville La Salle, Quebec, Canada

[22] Filed: Aug. 25, 1970

[21] Appl. No.: 66,872

[52] U.S. Cl. .................................. 260/251 R, 424/251
[51] Int. Cl. ............................................. C07d 51/38
[58] Field of Search ................................ 260/251 R

[56] References Cited
OTHER PUBLICATIONS
Mannich et al., – Ber. 55, 365–366, 369 (1922).

*Primary Examiner*—Donald G. Daus
*Assistant Examiner*—R. V. Rush
*Attorney, Agent, or Firm*—Fisher, Christen and Sabol, Virgil H. Marsh

[57] ABSTRACT

Tetrahydropyrimidine-2-one compounds which have been found to possess useful biological properties in that such compounds act through the central nervous system as depressants and/or stimulants. For use as medicaments, the novel tetrahydropyrimidine compounds are normally administered in the form of pharmaceutical compositions containing, as an active ingredient, at least one of the tetrahydropyrimidine compounds in association with a physiologically acceptable carrier. Illustrative of such compounds are 1-(2'-hydroxyphenyl)-4-(3''-nitrophenyl)-1,2,3,6-tetrahydropyrimidine-2-one which shows CNS depressant effects and 1-adamantyl-4-(3'-nitrophenyl)-1,2,3,6-tetrahydropyrimidine-2-one which shows CNS stimulant effects. The 1,2,3,6-tetrahydropyrimidine-2-one compounds having central nervous system activity are prepared by the reaction of a β-aminoketone and an alkali metal cyanate which results in a tetrahydropyrimidine-2-one compound bearing a double bond in the 4,5 position.

8 Claims, No Drawings

1,2,3,6-TETRAHYDROPYRIMIDINE-2-ONE COMPOUNDS AND PROCESSES FOR MAKING THEM

BACKGROUND OF INVENTION

This invention relates to novel biologically active 1,2,3,6 tetrahydropyrimidine-2-one compounds, to pharmaceutical compositions containing such compounds, and to a method of treatment involving the administration of said compounds and compositions. This invention is further concerned with processes for preparing said novel tetrahydropyrimidine-2-ones.

DETAILED DESCRIPTION OF THE INVENTION

A. Composition of Matter — Novel Compounds

This invention in one of its composition of matter aspects provides novel $1R_1$-2-oxo-3H-4$R_2$-1,2,3,6-tetrahydropyrimidine compounds in which each of $R_1$ and $R_2$ represents a hydrocarbon, a substituted hydrocarbon or heterocyclic radical, and functional derivatives thereof. These compounds, therefore, may be represented by the following general formula:

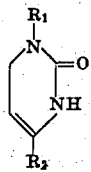

Formula I in which each of $R_1$ and $R_2$ represents a hydrocarbon, a substituted hydrocarbon or a heterocylic radical and functional derivatives thereof.

Preferred compounds within foregoing broad class are those represented by the following general formula:

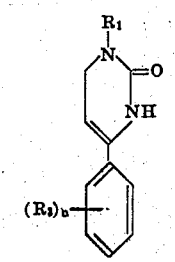

Formula II wherein $R_1$ has the same significance as in Formula I hereinbefore, $R_3$ represents a halogen atom or a nitro, cyano or a substituted or unsubstituted alkyl or alkoxy group, and n is 0 or an integer from 1 to 3, and functional derivatives thereof. Referring to substituent $R_1$ in the 1-position this may represent, for instance, a lower aliphatic hydrocarbon radical such as a lower alkyl, for instance, a methyl, ethyl, propyl, isopropyl, butyl, isobutyl, secondary butyl, tertiary butyl, pentyl, isopentyl, or neopentyl radical; a carbocyclic aliphatic hydrocarbon (alicyclic) radical in which the alicyclic portion may be saturated or may contain one or more than one double bonds depending on the number of ring carbon atoms such as monocyclic alkyl, bicyclic alkyl and tricyclic alkyl radical, for instance n-cyclopropyl, cyclobutyl, cyclopentyl, cyclohexyl, cycloheptyl, cyclooctyl, bicyclo-[2.2.1]-heptane, bicyclo-[3.1.0.]-hexane or tricyclo [3.3.1.1.]-decane (adamantyl) radical, a carbocyclic aliphatic-lower aliphatic hydrocarbon radical such as a monocyclic alkyl-lower alkyl, for instance cyclopropylmethyl, cyclobutylmethyl, cyclopentylmethyl, cyclohexylmethyl, or a cycloheptylmethyl radical; a carbocyclic aryl radical such as a monocyclic or bicyclic carbocyclic aryl, for example, phenyl or a 2-naphthyl radical; or a carbocyclic aryl-lower aliphatic hydrocarbon radical, primarily monocyclic carbocyclic aryl-lower alkyl or bicyclic carbocyclic aryl-lower alkyl, for instance, benzyl, 2-phenyl-ethyl, or napthyl-2-methyl radical. The various $R_1$ radicals may contain additional substituents; for instance, any aromatic, say, phenyl or naphthyl moiety, may be substituted by lower alkyl, for example methyl, or free or substituted, for example, 0-alkyl or 0-acyl hydroxyl.

These compounds of the invention are relatively high melting, usually white, off-white or yellow, crystalline solids which are substantially insoluble in water. They are, however, soluble in polar solvents like N,N-dimethylformamide and dimethyl sulfoxide. Examination of the compounds produced according to the hereinafter described processes reveals, upon n.m.r. and infrared spectrographic analyses, spectral data confirming the molecular structure hereinbefore set forth, such as the location of the double bond between the 4 and 5 position of the ring. For example, the infrared spectrum of the various compounds shows a hydrogen-bonded NH stretching band in the solid state at about 3200 cm$^{-1}$, along with a carbonyl (C=O) stretching band at about 1640 cm$^{-1}$. The infrared spectra taken in chloroform solutions show the free NH stretching band at about 3430 cm$^{-1}$. The n.m.r. spectrum in deuterated chloroform reveals proton resonance signal at 5.6$\tau$ (doublet integrating for 2 allylic protons), at 4.8$\tau$ (triplet, integrating for 1 vinylic proton) and at 2.1$\tau$ (singlet integrating for 1 NH proton). On addition of $D_2O$ this last signal completely disappeared confirming the foregoing interpretation. The aforementioned physical characteristics taken together with the nature of the starting materials and the mode of synthesis, positively confirms the structure of the compounds.

It has been found in accordance with the present invention that the new 1-$R_1$-2-oxo-3-H-4-$R_2$-1,2,3,6-tetrahydropyrimidine compounds possess useful biological properties in that such compounds typically show pronounced central nervous system effects when administered to mice and rats, usually with a relatively low toxicity. Compounds exhibiting such effects may be of value for therapeutic applications as potential psychotropic drugs. Usually the compounds show a marked depressive effect, often preceded by a brief stimulatory effect, on the central nervous system when administered to rats, indicative of ultimate anticonvulsant, relaxant, tranquilizing and similar clinical use in human beings. Such compounds therefore have a pharmacological profile showing similarities both to certain substances which depress the central nervous system and to certain substances which stimulate the central nervous system. However, in some instances, notably when $R_1$ is a tricyclic alkyl radical such as an adamantyl radical, the compounds have a significant stimulatory effect on the central nervous system when administered to mice and rats without any marked depressive effect, indicative of ultimate antidepressant and similar clinical use in human beings. While the compounds of this invention do differ among themselves in the magnitude of their respective activities, they are generally characterised by the type of activity indicated in the foregoing.

Particularly pronounced CNS depressive activity, usually with a negligible degree of side effects and a low degree of toxicity are found in the 1-$R_1$-2-oxo-3-H-4-$R_2$-1,2,3,6-tetrahydropyrimidine compounds of the formula:

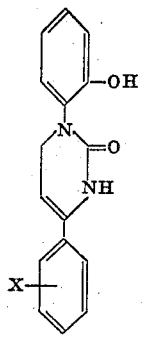

Formula III in which X represents a nitro or trifluoroalkyl group, or a halogen atom. Preferably ring substituent X is located in a meta position. Representative of this group of compounds are: 1-(2'hydroxyphenyl)-4-(3''-nitrophenyl)-1,2,3,6-tetrahydropyrimidine-2-one; 1-(2'-hydroxyphenyl)-4-(3''-trifluoromethylphenyl-1,2,3,6-tetrahydropyrimidine-2-one; 1-(2'-hydroxyphenyl)-4-(3''-bromophenyl)-1,2,3,6-tetrahydropyrimidine-2-one; 1-(2'-hydroxyphenyl)-4-(3''-chlorophenyl-1,2,3,6-tetrahydropyrimidine-2-one; and 1-(2'-hydroxyphenyl)-4-(3''-idophenyl)-1,2,3,6-tetrahydropyrimidine-2-one.

An additional group of compounds of this series which also show good CNS depressive activity usually with a negligible degree of side effects and a low degree of toxicity are the compounds of the formula:

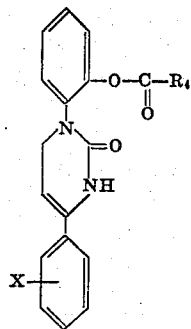

Formula IV in which $R_4$ represents a straight or branch-chain aliphatic hydrocarbon radical, especially an alkyl or alkenyl radical, or a monocyclic aryl such as phenyl radical and X represents a nitro or trifluoroalkyl group or a halogen atom. Preferably ring substituent X is located in a meta position. Representative of this group of compounds are: 1-(2'-acetoxyphenyl)-4-(3''-nitrophenyl)-1,2,3,6-tetrahydropyrimidine-2-one; 1-(2'-propoxyphenyl)-4-(3''-nitrophenyl)-1,2,3,6-tetrahydropyrimidine-2-one; 1-(2'-n-butyroxyphenyl)-4-(3''-nitrophenyl)-1,2,3,6-tetrahydropyrimidine-2-one; 1-(2-undecyleneoxyphenyl)-4-(3''-nitrophenyl)-1,2,3,6-tetrahydropyrimidine-2-one; 1-2'-benzoxyphenyl)-4-(3''-nitrophenyl)-1,2,3,6-tetrahydropyrimidine-2-one; 1-(2''-acetoxyphenyl)-4-(3''-bromophenyl)-1,2,3,6-tetrahydropyrimidine-2-one; 1-(2''-propoxyphenyl)-4-3''-bromophenyl)-1,2,3,6-tetrahydropyrimidine-2-one; 1-(2'-acetoxyphenyl)-4-(3''-chlorophenyl)-1,2,3,6-tetrahydropyrimidine-2-one; 1-(2'-propoxyphenyl)-4-(3''-chlorophenyl)-1,2,3,6-tetrahydropyrimidine-2-one; 1-(2-acetoxyphenyl)-4-(3''-iodophenyl)-1,2,3,6-tetrahydropyrimidine-2-one; 1-(2-propoxyphenyl)-4-(3''-iodophenyl)-1,2,3,6-tetrahydropyrimidine-2-one; 1-(2-acetoxyphenyl)-4-(3''-trifluoromethylphenyl)-1,2,3,6-tetrahydropyrimidine-2-one.

A group of compounds of this series which typically display pronounced stimulant effects on the CNS when administered to mice and rats, usually with a negligible degree of side effects and a low degree of toxicity, are compounds of the formula:

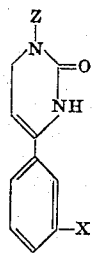

Formula V wherein Z represents a substituted or unsubstituted tricyclic alkyl radical and substituent X, preferably located in a meta position, represents a nitro group or a halogen atom. Representative of this group of compounds is. 1-adamantyl-4-(3'-nitrophenyl)-1,2,3,6-tetrahydropyrimidine-2-one. This particular compound is also found to antagonize markedly the toxic effects of amphetamine administered to mice.

B. Composition of Matter — Pharmaceutical Compositions

The present invention further provides in another of its aspects a pharmaceutical composition comprising as an essential active ingredient at least one active compound of Formula I in association with a pharmaceutically acceptable carrier therefor.

The compositions of the present invention are preferably administered orally, rectally or parenterally. Advantageously, the composition is in a dosage unit form appropriate to the desired mode of administration. For example, the dosage unit may be a tablet, capsule, pill, powder, packet, granule, wafer, elixir, suppository, or a measured quantity of a suspension, solution, a syrup or segregated multiples of the foregoing. The term "dosage unit form" as used in the specification and claims refers to physically discrete units suitable as unitary dosages for human subjects and animals, each unit containing a predetermined quantity of active material calculated to produce the desired therapeutic effect in admixture, or otherwise in association, with a pharmaceutical carrier, the quantity of the active ingredient being such that one or more units are normally required for a single therapeutic administration or that, in the case of severable units such as scored tablets, at least one fraction such as a half or a quarter of a severable unit is required for a single therapeutic administration.

Usually the compositions of this invention contain the active ingredient in an amount of at least 0.5% by weight based on the total weight of the composition and not more than 95% by weight. Conveniently, the compositions of the invention when in dosage unit form contain 0.5 mg. to 100 mg., and more conveniently from 5 mg. to 50 mg., of the active ingredient of Formula I.

The compositions of the present invention will normally consist of at least one compound of Formula I, advantageously a compound of Formula II, and more advantageously a compound from the preferred groups defined by Formulae III, IV, and V, admixed with a carrier, or diluted by a carrier, or enclosed or encapsulated by a carrier in the form of a capsule, sachet, catchet, paper or other container. A carrier which serves as a vehicle, excipient or diluent medium for the therapeutically active ingredient may be a solid, semisolid or a sterile liquid.

Some examples of the carriers which may be employed in the pahrmaceutical compositions of the invention are lactose, dextrose, sorbitol, mannitol, starches such as wheat, corn, or potatoe starch, gum acacia, calcium phosphate, liquid paraffin, cocoa butter, oil of theobroma, alginates, tragacanth, gelatin, syrup B.P., methyl cellulose, polyoxethylene sorbitan monolaurate, and methyl and propyl hydroxybenzoates. In the case of tablets, a lubricant may be incorporated to prevent sticking and binding of the powdered ingredients in the dies and on the punch of the tabletting machine. For such purpose, there may be employed, for example, talc, aluminum, magnesium or calcium stearates or polyethylene glycols (Carbowaxes) of suitable molecular weight.

The pharmaceutical compositions of this invention may contain, in addition to the active 1-$R_1$-2-oxo-3-H-4-$R_2$-1,2,3,6-tetrahydropyrimidine ingredient, one of more other physiologically active ingredients which elicit desirable complementary effects.

C. Method of Treatment

As indicated hereinbefore, it has been found in accordance with the present invention that the compounds of Formula I possess useful biological properties in that such compounds possess the inherent applied use characteristics of exerting a depressant and/or stimulant effect on the central nervous system. Compounds possessing such activity may have very valuable therapeutic utility as potential medicaments in the form of pharmaceutical compositions in eliciting advantageous central nervous system effects when administered to humans and animals. Accordingly, this invention in its method-of-use aspects provides a method of eliciting depressant and/or stimulant central nervous system effects, including humans and animals, by administering a therapeutically effective dose of one or more of the active compounds of Formula I (preferably a compound of Formula II, and more preferably a compound of Formula III, IV or V). The dosage administered will be dependent upon such factors as the CNS symptom being treated, the age, health and weight of the recipient, the extent of the symptom, kind of concurrent treatment, if any, and the precise nature of the effect desired. In practise, based upon standard pharmacological animal studies, particularly in mice, it has been found that the administration of doses of about 1 to 100 mg. of the active compounds of this invention per kg. of animal body weight will usually elicit the aforementioned CNS effect(s) normally without producing any marked side effects.

D. Process

The novel compounds of this invention may be prepared by reacting a β-amino-ketone compound of the following formula:

$$R_1-NH-CH_2-CH_2-\overset{O}{\underset{\|}{C}}-R_2 \qquad \text{Formula VI}$$

wherein $R_1$ and $R_2$ have the same significance as hereinbefore with a cyanate, especially an alkali metal cyanate such, for example, as potassium or sodium cyanate. Preferably the β-amino-ketone is reacted with the cyanate in about stoichiometric amounts. Preferably, the reaction is conducted under acidic conditions. Hence, it is often convenient to use the β-amino-ketone in the form of an acid addition salt such, for example, as a hydrohalide salt thereof. Conveniently the reaction is carried out in the presence of an acidic solvent, for example, in an acid such as acetic acid, formic acid or the like. Usually the reaction is effected under relatively mild conditions at a temperature of between ambient temperature and 100°C, preferably between 40° and 70°C.

That the β-amino-ketone compound and the cyanate should condense together with formation of a tetrahydropyrimidine nucleus containing a carbon-carbon double bond at the 4-5 position in the ring is surprising and unexpected since the skilled chemist would have expected the final compounds to contain a C=N linkage. At the present time, on the basis of spectral data available to us, it is believed that the reaction proceeds through the initial formation of a substituted urea as an intermediate which cyclises spontaneously, with the elimination of water, by nucleophilic attack of the primary urea nitrogen on the electron deficient carbonyl carbon atom followed by an internal rearrangement with migration of the double bond from the 3-4 to the 4-5 position in the tetrahydropyrimidine ring. This sequence of reactions is indicated below:

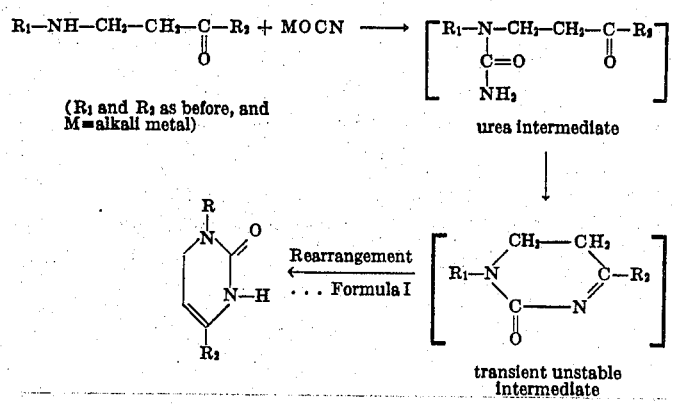

In the above process it is of advantage to use as starting compounds those which lead to the formation of the tetrahydropyrimidines mentioned hereinbefore as being especially valuable.

Illustrating this generally applicable process is the preparation of a 1-o-hydroxyphenyl-2-oxo-4-m-$R_3$-phenyl-1,2,3,6,-tetrahydropyrimidine, such a compound may be obtained by:

i. dissolving a corresponding β-anilino-m-$R_3$-propiophenone in the form of an acid addition, typically hydrogen halide, salt in an acid, especially acetic acid, advantageously at a temperature of about 40° to about 70°C, say about 60°C;

ii. adding a stoichiometric amount of an alkali cyanate, such as potassium cyanate, to the resulting solution whereupon an exothermic reaction takes place resulting in ring closure with formation of the pyrimidine nucleus. During the course of this reaction, for each mole of reaction product there is formed a mole of an alkali metal halide.

If desired, the tetrahydropyrimidine compound so-obtained may be transformed according to known methods into functional derivatives such, for example, as 0-alkyl or 0-acyl derivatives.

Formation of the 0-acyl derivatives may be accomplished by reacting a corresponding free phenolic hydroxy compound with the appropriate carboxylic acid or a functional derivative thereof such as a halide, for example, a chloride or an anhydride. The esterification reaction may be carried out according to known conditions, for example, in the absence or presence of a condensing agent such as a liquid organic base, for example, triethylamine, pyridine or collidine, particularly if an anhydride, for example, acetic anhydride is used, or trifluoroacetic anhydride, particularly if a free acid, say, acetic, butyric, valeric or cyclopropylcarboxylic acid is used as the esterifying agent. Liquid basic condensation reagents, such as, for example, pyridine or collidine, may simultaneously serve as solvents. A liquid acylation reagent, such as, for example, acetic acid anhydride may be used without an additional solvent.

The compounds prepared according to the foregoing procedures are, in general, crystalline solids that may be recovered by filtration or by centrifuging and purified by recrystallization from an inert organic solvent or solvent mixture such as, for example, methanol, ethanol, acetone, ethyl acetate, acetone-hexane, N,N-dimethylformamide, or by chromatography using an absorbent such as silica gel or magnesium silicate.

The β-amino-ketone starting compounds of Formula VI used in the above-described processes are known, or if new, may be obtained according to procedures used for the manufacture of known compounds, as illustrated in the following Examples.

DETAILED DESCRIPTION OF ILLUSTRATIVE EMBODIMENTS

The following Examples are provided by way of affording a more comprehensive understanding of various aspects of this invention. In these Examples, all melting points were determined by the capillary tube method.

EXAMPLE 1

Part A

β-(o-Hydroxyanilino)-m-nitropropiophenone

6 G. of β-diethylamino-m-nitropropiophenone hydrochloride were added to 60 ml. of 50% aqueous ethanol and the mixture refluxed with stirring until the hydrochloride had completely dissolved. 1.5 G. of o-aminophenol were added and the solution refluxed for 0.5 hours, then set aside to cool. The reaction product crystallized out of solution to yield 1.6 G. of the desired β-(o-hydroxyanilino)-m-nitropropiophenone which had a melting point of 107° to 109°C.

Part B

β-(o-Hydroxyanilino)-m-nitropriopiophenone hydrochloride

The free base obtained by the procedure of Part A was dissolved in 5 ml. ethanol and concentrated hydrochloric acid added until the solution was acidic to litmus. Evaporation of the solvent in vacuo, and crystallization from methanol-acetone yielded 1.6 G. of the desired β-(o-hydroxyanilino-m-nitropropiophenone) hydrochloride which had a melting point of 172° to 173°C.

Part C 1-(2'-Hydroxyphenyl)-4-(3''-nitrophenyl)-1,2,3,6-tetrahydropyrimidine-2-one 1.6 G. of β-(o-hydroxyanilino)-m-nitropropiophenone hydrochloride obtained by the procedure of Part B were dissolved in 10 ml. acetic acid at 60°C. 2 G. of potassium cyanate were added and an exothermic reaction was noted. After cooling to room temperature, 20 mls. water were added, and the crystalline 1(2'-hydroxyphenyl)-4-(3''-nitrophenyl)-1,2,3,6-tetrahydropyrimidine-2-one which precipitated out separated and recovered by filtration. The compound recrystallized from a mixture of N,N-dimethylformamide and ethyl acetate had a melting point of 228° to 230°C. Analysis of the product yielded the following results:

| | | C(%) | H(%) | N(%) |
|---|---|---|---|---|
| $C_{16} H_{13} N_3 O_4$ | Calculated: | 61.73 | 4.58 | 13.36 |
| | Found: | 61.53 | 4.20 | 13.49 |

EXAMPLE 2

Part A

β-(o-Hydroxyanilino)-propiophenone

4 G. of β-diethylaminopropiophenone hydrochloride were dissolved in 50 ml. of 50% aqueous ethanol, and the mixture refluxed with stirring until the hydrochloride had completely dissolved. 2.1 G. of o-aminophenol were added and the solution refluxed for 0.5 hours, then set aside to cool. The reaction product crystallized out of solution to yield 3 G. of the desired β-(o-hydroxyanilino)-propiophenone which had a melting point of 116° to 120°C.

Part B

β-(o-Hydroxyanilino)-propiophenone hydrochloride

The free base obtained by the procedure of Part A was transformed into the hydrochloride salt by reaction of an ethanolic solution of the base with concentrated hydrochloric acid following the procedure of Part B of the foregoing Example. This hydrochloride salt had a melting point of 160° to 162°C.

Part C 1-(2'-Hydroxyphenyl)-4-phenyl-1,2,3,6-tetrahydropyrimidine-2-one

4 G. of β-(hydroxyanilino)-propiophenone hydrochloride obtained by the procedure of Part B were dissolved in 50 ml. of acetic acid at 60°C. 3.4 G. of potassium cyanate were added and the exothermic reaction and then isolation of the desired compound conducted following exactly the same procedure as set forth in Example 1, Part C. The 1-(2'-hydroxyphenyl)-4-phenyl-1,2,3,6-tetrahydropyrimidine-2-one so-obtained was recrystallized from ethanol; it had a melting point of 178° to 181°C. Analysis of the product yielded the following results:

|  | | C(%) | H(%) | N(%) |
|---|---|---|---|---|
| $C_{16}H_{14}N_2O_2$ | Calculated: | 72.44 | 5.33 | 10.78 |
|  | Found: | 72.71 | 5.30 | 10.52 |

EXAMPLE 3

Part A
β-(o-Hydroxyanilino)-p-nitropropiophenone

3 G. of β-diethylamino-p-nitropropiophenone hydrochloride were added to 50 ml. of 50% aqueous ethanol and the mixture refluxed with stirring until the hydrochloride had dissolved completely. 1.4 G. of o-aminophenol were added and the solution refluxed for 0.5 hours then set aside to cool. The reaction product crystallized out of solution to yield the desired β-(o-hydroxyanilino)-p-nitropropiophenone, which had a melting point of 151° to 152°C.

Part B
β-(o-Hydroxyanilino)-p-nitropropiophenone hydrochloride

The free base prepared by the procedure of Part A was transformed into the corresponding hydrochloride salt by reaction of an ethanolic solution of the base with concentrated hydrochloric acid following the procedure of Part B of Example 1. This hydrochloride salt had a melting point of 161° to 163°C.

Part C
1-(2'-Hydroxyphenyl)-4-(4'-nitrophenyl)-1,2,3,6-tetrahydropyrimidine-2-one 1.5 G. of β-(o-hydroxyanilino)-p-nitropropiophenone hydrochloride obtained by the procedure of Part B were dissolved in 10 ml. of acetic acid at 60°C. 2 G. of potassium cyanate were added and the reaction and then the isolation of the desired compound conducted following exactly the same procedure as set forth in Example 1, Part C. The 1-(2'-hydroxyphenyl)-4-(4''-nitrophenyl)-1,2,3,6-tetrahydropyrimidine-2-one so obtained was recrystallized from a mixture of N,N-dimethylformamide and ethyl acetate; it had a melting point of 219° to 220°C. Analysis of the product yielded the following results:

|  | | C(%) | H(%) | N(%) |
|---|---|---|---|---|
| $C_{16}H_{13}N_3O_4$ | Found: | 61.64 | 4.48 | 13.31 |
|  | Calculated: | 61.73 | 4.20 | 13.45 |

EXAMPLE 4

Part A
β-(o-Methoxyanilino)-m-nitropropiophenone

3 G. of β-dimethylamino-m-nitropropiophenone hydrochloride were added to a mixture of 30 ml. ethanol and 30 ml. water which was stirred until all the phenone had dissolved. 1.4 G. of o-anisidine were added and the solution refluxed for 0.5 hours then set aside to cool. The reaction product crystallized out of solution to yield 3 g. of the desired β-(o-methoxyanilino)-p-nitropropiophenone, which had a melting point of 84° to 86°C.

Part B
β-(o-Methoxyanilino)-m-nitropropiophenone hydrochloride

The free base prepared by the procedure of Part A was transformed into the corresponding hydrochloride salt by reaction of an ethanolic solution of the base (3 G. in 5 ml.) with concentrated hydrochloric acid following the procedure of Part B of Example 1.

Part C
1-(2'-Methoxyphenyl)-4-(3''-nitrophenyl)-1,2,3,6-tetrahydropyrimidine-2-one The β-(o-methoxyanilino)-m-nitropropiophenone hydrochloride obtained by the procedure of Part B were dissolved in 20 ml. of acetic acid at ambient temperature (0.25°C). 3 G. of potassium cyanate were added with stirring and an exothermic reaction was noted. After cooling to around ambient temperature, water was added until a precipitate began to form. The aqueous solution was extracted 3 times with 10 mls. of ethyl acetate, and the organic extracts combined then washed successively with 10% aqueous sodium hydroxide, water, 10% aqueous hydrochloric acid, water, dried over sodium sulphate, filtered and evaporated to dryness. The residue was recrystallized from an ethanol-ether mixture to give the desired 1-(2'-methoxyphenyl)-4-(3''-nitrophenyl)-1,2,3,6-tetrahydropyrimidine-2-one, which had a melting point of 247° to 249°C. Analysis of the product yielded the following results:

|  | | C(%) | H(%) | N(%) |
|---|---|---|---|---|
| $C_{17}H_{15}O_4N_3$ | Found: | 62.91 | 4.39 | 12.82 |
|  | Calculated: | 62.76 | 4.64 | 12.91 |

EXAMPLE 5

Part A
β-(o-Carboxyanilino)-m-nitropropiophenone

5 G. of β-diethylamino-m-nitropropiophenone hydrochloride were added to 60 ml. of 50% aqueous ethanol and stirring continued until all the phenone had dissolved. 2.5 G. of anthranilic acid were added and the solution refluxed for 0.5 hours then set aside to cool. The reaction product crystallized out of solution to yield β-(o-carboxyanilino)-m-nitropropiophenone, which had a melting point of 165° to 169°C.

Part B
β-(o-Carboxyanilino)-m-nitropropiophenone

The free base prepared by the procedure of Part A was transformed into the corresponding hydrochloride salt by suspension in concentrated hydrochloric acid. This hydrochloride salt had a melting point of 156°C (decomposition).

Part C
1-(2'-carboxyphenyl)-4-(3''-nitrophenyl)-1,2,3,6-tetrahydropyrimidine-2-one 4 G. of β-(o-carboxyanilino)-m-nitropropiophenone hydrochloride obtained by the procedure of Part B were suspended in 20 ml. of acetic acid at 60°C. 2 G. of potassium cyanate were added and, as usual, an exothermic reaction was noted; this was accompanied by the complete solvation of the hydrochloride. The desired 1-(2'-carboxyphenyl)-4-(3''-nitrophenyl)-1,2,3,6-tetrahydropyrimidine-2-one so-formed was isolated following exactly the same procedure as set forth in Example 1, Part C. The compound was recrystallized from a mixture of N,N-dimethylformamide and acetone; it had a melting point of 247° to 250°C. Analysis of the product yielded the following results:

| | | C(%) | H(%) | N(%) |
|---|---|---|---|---|
| $C_{17}H_{13}N_3O_5$ | Found: | 60.01 | 4.04 | 12.15 |
| | Calculated: | 60.17 | 3.86 | 12.38 |

EXAMPLE 6

Part A

β-Diethylamino-m-bromopropiophenone hydrochloride

This compound was prepared by a Mannich reaction in which a mixture of 25 G. of m-bromo-acetophenone, 23 G. of diethylamine hydrochloride and 22 ml. of 37% aqueous formaldehyde acidified with a few drops of concentrated hydrochloric acid was heated under reflux for 2 hours, and then concentrated. After cooling to room temperature, the reaction mixture was diluted with acetone and 21 G. of crystalline β-diethylamino-m-bromopropiophenone hydrochloride collected by filtration. This compound had a melting point of 107° to 109°C.

Part B

β-(o-Hydroxyanilino)-m-bromopropiophenone hydrochloride

21 G. of β-diethylamino-m-bromopropiophenone prepared by the procedure of Part A were added to 100 ml. of 50% aqueous ethanol and stirring continued until all the phenone had dissolved. 6.1 G. of o-aminophenol were added and the solution refluxed for 0.5 hours then set aside to cool. Thereafter, the solution was extracted twice with 50 ml. ethyl acetate, the organic extracts combined and an excess (10 mls.) concentrated hydrochloric acid added to the organic phase. The solution was set aside and after a short time β-(o-hydroxyanilino)-m-bromopropiophenone hydrochloride crystallized out. This compound was recrystallized from a methanol-acetone mixture; it had a melting point of 168° to 171°C.

Part C 1-(2'-Hydroxyphenyl)-4-(3''-bromophenyl)-1,2,3,6-tetrahydropyrimidine-2-one 6 G. of β-(o-hydroxyanilino)-m-bromopropiophenone hydrochloride prepared by the procedure of Part B were dissolved in 50 ml. of acetic acid at 60°C. 3 G. of potassium cyanate were added and, as usual, an exothermic reaction was noted. After cooling to room temperature, 100 mls. water were added, and the 1-(2'-hydroxyphenyl)-4-(3''-bromophenyl)-1,2,3,6-tetrahydropyrimidine-2-one precipitated out of solution. The suspension was extracted twice with 20 mls. ethyl acetate. The organic extracts were combined and washed successively with 10% aqueous sodium hydroxide, 10% aqueous hydrochloric acid and water then dried over sodium sulfate and concentrated by heating in vacuo. The concentrated solution was set aside to cool, when crystals of the desired 1-(2'-hydroxyphenyl)-4-(3''-bromophenyl)-1,2,3,6-tetrahydropyrimidine-2-one separated out and were collected by filtration. The product had a melting point of 180° to 181°C., and analysis thereof yielded the following results:

| | | C(%) | H(%) | N(%) | Br(%) |
|---|---|---|---|---|---|
| $C_{16}H_{13}N_2O_2Br$ | Found | 55.61 | 3.70 | 7.96 | 23.00 |
| | Calculated | 55.66 | 3.79 | 8.11 | 23.15 |

EXAMPLE 7

Part A

β-Diethylamino-m-chloropropiophenone hydrochloride

This compound was prepared by a Mannich reaction in which a mixture of 17 G. of m-chloroacetophenone, 15 G. of diethylamine hydrochloride and 18 ml. of 37% aqueous formaldehyde acidified with a few drops of concentrated hydrochloric acid was heated under reflux for 2 hours. After cooling to room temperature, 18 g. of β-diethylamino-m-chloropropiophenone hydrochloride were collected by filtration. This compound had a melting point of 120° to 123°C.

Part B

β-(o-Hydroxyanilino)-m-chloropropiophenone hydrochloride

16 G. of β-diethylamino-m-chloropropiophenone hydrochloride prepared by the procedure of Part A were added to 100 ml. of 50% aqueous ethanol and stirring continued until all the phenone had dissolved. 6.3 G. of o-aminophenol were added and the solution refluxed for 0.5 hours, then set aside to cool. Thereafter, the solution was extracted twice with 50 ml. ethyl acetate, the organic extracts combined and an excess (10 mls.) concentrated hydrochloric acid added to the organic phase. The solution was set aside and after a short time 15 G. β-(o-hydroxyanilino)-m-chloropropiophenone hydrochloride crystallized out. This compound was recrystallized from a methanol-acetone mixture; it had a melting point of 161° to 163°C.

Part C 1-(2'-hydroxyphenyl)-4-(3''-chlorophenyl)-1,2,3,6-tetrahydropyrimidine-2-one 3 G. of β-(o-hydroxyanilino)-m-chloropropiophenone hydrochloride prepared by the procedure of Part B were dissolved in 50 ml. of acetic acid at 60°C. 2 G. of potassium cyanate were added and, as usual, an exothermic reaction was noted. After cooling to room temperature, 100 mls. water were added, and the 1-(2'-hydroxyphenyl)-4-(3''-chlorophenyl)-1,2,3,6-tetrahydropyrimidine-2-one precipitated out of solution. The suspension was extracted twice with 20 mls. ethyl acetate. The organic extracts were combined and washed successively with 10% aqueous sodium hydroxide, 10% aqueous hydrochloric acid and water, then dried over sodium sulfate and concentrated by heating in vacuo. The concentrated solution was set aside to cool, when crystals of the desired 1-(2'-hydroxyphenyl)-4-(3''-chlorophenyl)-1,2,3,6-tetrahydropyrimidine-2-one separated out and were collected by filtration. The product had a melting point of 173° to 175°C, and analysis thereof yielded the following results:

| | | C(%) | H(%) | N(%) | Cl(%) |
|---|---|---|---|---|---|
| $C_{16}H_{13}N_2O_2Cl$ | Found | 64.07 | 4.59 | 9.39 | 11.82 |
| | Calculated | 63.89 | 4.35 | 9.31 | 11.78 |

EXAMPLE 8

Part A

β-Dimethylamino-m-iodopropiophenone hydrochloride

This compound was prepared by a Mannich reaction in which a mixture of 24 G. of m-iodoacetophenone, 6.4 G. of dimethylamine hydrochloride and 3.2 g. of paraformaldehyde dissolved in 20 ml. acetic acid was heated under reflux for two hours, then concentrated in vacuo. After cooling to room temperature, the reaction mixture was diluted with acetone and 23 g. of crystalline β-dimethylamino-m-iodopropiophenone hydrochloride collected by filtration. This compound recrystallized from a methanol-acetone mixture had a melting point of 212° to 214°C.

Part B
β-(o-Hydroxyanilino)-m-iodopropiophenone hydrochloride 6.5 G. of β-dimethylamino-m-iodopropiophenone hydrochloride prepared by the procedure of Part A were added to 60 ml. of an ethanol-water mixture (1:1) and stirring continued until all the phenone had dissolved. 2 G. of o-aminophenol were added and the solution refluxed for 0.5 hours, then set aside to cool. Thereafter, the solution was extracted twice with 10 ml. ethyl acetate, the organic extracts combined and an excess (3 mls.) concentrated hydrochloric acid added to the organic phase. The solution was set aside and after a short time 3 g. β-(o-hydroxyanilino)-m-iodopropiophenone hydrochloride, crystallized out. This compound, recrystallized from a methanol-acetone mixture, had a melting point of 174° to 176°C.

Part C
1-(2'-hydroxyphenyl)-4-(3''-iodophenyl)-1,2,3,6-tetrahydropyrimidine-2-one 3 G. of β-(o-hydroxyanilino)-m-bromopropiophenone hydrochloride prepared by the procedure of Part B were dissolved in 20 ml. of acetic acid at 60°C. 1 G. of potassium cyanate was added and, as usual, an exothermic reaction was noted. After cooling to room temperature, 40 mls. water were added, and the 1-(2'-hydroxyphenyl)-4-(3''-iodophenyl)-1,2,3,6-tetrahydropyrimidine-2-one precipitated out of solution. The suspension was extracted twice with 10 mls. ethyl acetate. The organic extracts were combined and washed successively with 10% aqueous sodium hydroxide, 10% aqueous hydrochloric acid and water then dried over sodium sulfate and concentrated by heating in vacuo. The concentrated solution was set aside to cool, when crystals of the desired 1-(2'-hydroxyphenyl)-4-(3''-iodophenyl)-1,2,3,6-tetrahydropyrimidine-2-one separated out and were collected by filtration. The compound recrystallized from ethyl acetate had a melting point of 181° to 183°C. Analysis of this product yielded the following results:

| | | C(%) | 4(%) | N(%) | I(%) |
|---|---|---|---|---|---|
| $C_{16}H_{13}N_2O_2I$ | Found | 49.17 | 3.69 | 6.80 | 32.16 |
| | Calculated | 48.99 | 3.34 | 7.14 | 32.36 |

EXAMPLE 9

Part A
β-Dimethylamino-m-trifluoromethylpropiophenone hydrochloride

This compound was prepared by a Mannich reaction in which a mixture of 17 g. of m-trifluoromethylacetophenone, 6.5 g. of dimethylamine hydrochloride and 4.2 g. of paraformaldehyde dissolved in 20 ml. acetic acid was heated under reflux for 2 hours, then concentrated in vacuo. After cooling to room temperature, the reaction mixture was diluted with acetone and 20 g. of crystalline β-dimethylamino-m-trifluoromethylpropiophenone collected by filtration. This compound recrystallized from a methanol-acetate mixture had a melting point of 148° to 150°C.

Part B
β-(o-Hydroxyanilino)-m-trifluoromethylpropiophenone hydrochloride 2.8 G. of β-dimethylamino-m-trifluoromethylpropiophenone hydrochloride prepared by the procedure of Part A were added to 20 ml. of ethanol-water mixture (1:1) and stirring continued until all the phenone had dissolved. 1 G. of o-aminophenol was added and the solution refluxed for 0.5 hours, then set aside to cool. Thereafter, the solution was extracted twice with 10 ml. ethyl acetate, the organic extracts combined and an excess (3 mls.) concentrated hydrochloric acid added to the organic phase. The solution was set aside and after a short time 1.6 β-(o-hydroxyanilino-m-trifluoromethylpropiophenone hydrochloride crystallized out. This compound, recrystallized from a methanol-acetate mixture, had a melting point of 172° to 175°C.

Part C
1-(2'-Hydroxyphenyl)-4-(3''-trifluoromethylphenyl)-1,2,3,6-tetrahydropyrimidine-2-one 7 G. of β-(o-hydroxyanilino)-m-trifluoromethylpropiophenone hydrochloride prepared by the procedure of Part B were dissolved in 20 ml. of acetic acid at 60°C. 3 G. of potassium cyanate were added and, as usual, an exothermic reaction was noted. After cooling to room temperature, 40 mls. water were added, and the 1-(2'-hydroxyphenyl)-4-(3''-trifluoromethylphenyl)-1,2,3,6-tetrahydropyrimidine-2-one precipitated out of solution. The suspension was extracted twice with 20 mls. ethyl acetate. The organic extracts were combined and washed successively with 10% aqueous sodium hydroxide, 10% aqueous hydrochloric acid and water then dried over sodium sulfate and concentrated by heating in vacuo. The concentrated solution was set aside to cool, when crystals the desired 1-(2'-hydroxyphenyl)-4-(3''-trifluoromethyl)-1,2,3,6-tetrahydropyrimidine-2-one separated out and were collected by filtration. The compound recrystallized from ethyl acetate had a melting point of 182° to 183°C. Analysis of the product yielded the following results:

| | | C(%) | H(%) | N(%) |
|---|---|---|---|---|
| $C_{17}H_{13}N_2O_2F_3$ | Found: | 60.48 | 4.07 | 8.60 |
| | Calculated: | 61.07 | 3.92 | 8.38 |

EXAMPLE 10

1-(2'-Hydroxyphenyl)-4-(3''-cyanophenyl)-1,2,3,6-tetrahydropyrimidine-2-one 1.5 G. of 1-(2'-hydroxyphenyl)-4-(3''-iodophenyl)-1,2,3,6-tetrahydropyrimidine-2-one prepared by the procedure of Part C of Example 8 were refluxed for 6 hours in 20 ml. N,N-dimethylformamide containing 1 g. of anhydrous cuprous cyanide. The solution was set aside to cool to ambient temperature, then poured into 20 ml. saturated ferric chloride solution. The reaction mixture was extracted with ethyl acetate and the organic extracts washed, in turn, with 10% aqueous hydrochloric acid, water, 10% aqueous sodium carbonate and water. On evaporation to dryness, 600 mg. of a residue were obtained which was purified by column chromatography using a silica-gel adsorbent. The fraction eluted with 2% ethyl acetate-methanol mixture crystallized to give the desired 1-(2'-hydroxyphenyl)-4-(3''-cyanophenyl)-1,2,3,6-tetrahydropyrimidine-2-one in good yield; it had a melting point of 265° to 267°C.

Analysis of this product yielded the following results:

| | | C(%) | H(%) | N(%) |
|---|---|---|---|---|
| $C_{17}H_{13}N_3O_2$ | Found: | 70.34 | 4.34 | 14.60 |
| | Calculated: | 70.09 | 4.49 | 14.42 |

EXAMPLE 11

Part A

β-Adamantanylamino-m-propiophenone hydrochloride

A mixture of 4.5 g. of m-nitroacetophenone, 4.5 ml. of 37% aqueous formaldehyde and 5 g. 1-aminoadamantane hydrochloride acidified with a few drops concentrated hydrochloric acid was heated under reflux for 2 hours. After cooling to room temperature, the reaction mixture was diluted with acetone and the desired crystalline β-adamantanyl-m-nitropropiophenone hydrochloride which separated out collected by filtration. This compound had a melting point of 182° to 184°C.

Part B

1-Adamantyl-4-(3'-nitrophenyl)-1,2,3,6-tetrahydropyrimidine-2-one.

4.5 G. of β-adamantanylamino-m-nitropropiophenone hydrochloride prepared by the procedure of Part A were suspended in 20 ml. of acetic acid and the suspension heated under reflux until the hydrochloride went into solution. 1.5 G. of potassium cyanate were added and, as usual, an exothermic reaction was noted. After cooling to room temperature 40 mls. water were added and the precipitated 1-adamantyl-4-(3''-nitrophenyl)-1,2,3,6-tetrahydropyrimidine-2-one so-formed collected by filtration. This precipitate was extracted with hot methanol, and the insoluble fraction crystallized from N,N-dimethylformamide to yield 0.5 g. of the desired 1-adamantyl-4-(3'-nitrophenyl)-1,2,3,6-tetrahydropyrimidine-2-one with a melting point of 225° to 227°C. Analysis of this product yielded the following results:

| | | C(%) | H(%) | N(%) |
|---|---|---|---|---|
| $C_{20}H_{23}N_3O_3$ | Found: | 67.42 | 6.62 | 12.00 |
| | Calculated: | 67.97 | 6.56 | 11.89 |

EXAMPLE 12

Part A

β-Cyclohexylamino-m-nitropropiophenone hydrochloride

A mixture of 8 g. of m-nitroacetophenone, 4 ml. of 37% aqeuous formaldehyde and 7 g. cyclohexylamine hydrochloride acidified with a few drops concentrated hydrochloric acid was heated under reflux for 2 hours. After cooling to room temperature, the reaction mixture was diluted with acetone and 10 g. of the desired crystalline β-cyclohexylamino-m-nitropropiophenone hydrochloride which separated out collected by filtration. This compound had a melting point of 182° to 185°C.

Part B

1-Cyclohexyl-4-(3'-nitrophenyl)-1,2,3,6-tetrahydropyrimidine-2-one.

4 G. of β-cyclohexylamino-m-nitropropiophenone hydrochloride prepared by the procedure of Part A were suspended in 20 ml. of acetic acid and the suspension heated under reflux until the hydrochloride went into solution. 1.5 G. of potassium cyanate were added and, as usual, an exothermic reaction was noted. After cooling to room temperature 40 mls. water were added and the 1-cyclohexyl-4-(3'-nitrophenyl)-1,2,3,6-tetrahydropyrimidine-2-one which precipitated out was collected by filtration. This precipitate was extracted with hot methanol, and the insoluble fraction crystallized from N,N-dimethylformamide to yield the desired 1-cyclohexyl-4-(3'-nitrophenyl-1,2,3,6-tetrahydropyrimidine-2-one with a melting point of 205° to 207°C. Analysis of this product yielded the following results:

| | | C(%) | H(%) | N(%) |
|---|---|---|---|---|
| $C_{16}H_{19}N_3O_3$ | Found: | 63.72 | 6.50 | 13.82 |
| | Calculated: | 63.77 | 6.36 | 13.94 |

EXAMPLE 13

Part A

β-n-Butylamino-m-nitropropiophenone hydrochloride

A mixture of 10 g. of m-nitroacetophenone, 7 ml. of 37% aqueous formaldehyde and 9 g. n-butylamine hydrochloride acidified with a few drops concentrated hydrochloric acid was heated under reflux for 2 hours. After cooling to room temperature, the reaction mixture was diluted with acetone and the desired crystalline β-n-butylamino-m-nitropropiophenone hydrochloride which separated out was collected by filtration. This compound had a melting point of 145° to 148°C.

Part B 1-n-Butyl-4-(3'-nitrophenyl)-1,2,3,6-tetrahydropyrimidine-2-one

4 G. of β-n-butylamino-m-nitropropiophenone hydrochloride prepared by the procedure of Part A were suspended in 10 ml. of acetic acid and the suspension heated under relux for 0.5 hours. 1.5 G. of potassium cyanate were added and, as usual, an exothermic reaction was noted. After cooling to room temperature 40 mls. water were added and the 1-n-butyl-4-(3'-nitrophenyl)-1,2,3,6-tetrahydropyrimidine-2-one which precipitated out was collected by filtration. This precipitate was extracted with hot methanol, and the insoluble fraction crystallized from N,N-dimethylformamide to yield 1-n-butyl-4-(3'-nitrophenyl)-1,2,3,6-tetrahydropyrimidine-2-one with a melting point of 156° to 157°C. Analysis of this product yielded the following results:

| | | C(%) | H(%) | N(%) |
|---|---|---|---|---|
| $C_{14}H_{17}N_2O_3$ | Found: | 61.01 | 6.78 | 14.81 |
| | Calculated: | 61.07 | 6.22 | 15.26 |

EXAMPLE 14

Part A

β-Benzylamino-m-nitropropiophenone hydrochloride

A mixture of 18 g. of m-nitroacetophenone, 14 ml. of 37% aqueous formaldehyde and 16 g. benzylamine hydrochloride acidified with a few drops concentrated hydrochloric acid was heated under reflux for 2 hours. After cooling to room temperature, the reaction mixture was diluted with acetone and 23 g. of the desired crystalline β-benzylamino-m-nitropropiophenone hydrochloride which separated out collected by filtration. This compound had a melting point of 208° to 210°C.

Part B

1-Benzyl-4-(3'-nitrophenyl)-1,2,3,6-tetrahydropyrimidine-2-one.

5 G. of β-benzylamino-m-nitropropiophenone hydrochloride prepared by the procedure of Part A were suspended in 20 ml. of acetic acid and the suspension heated under reflux for 0.5 hours. 1.5 G. of potassium cyanate were added and, as usual, an exothermic reaction was noted. After cooling to room temperature 40 mls. water were added and the 1-benzyl-4-(3'-nitrophenyl)-1,2,3,6-tetrahydropyrimidine-2-one which precipitated out was collected by filtration. This precipitate was extracted with hot methanol, and the insoluble fraction crystallized from N,N-dimethylformamide to yield 4 g. of the desired 1-benzyl-4-(3'-nitrophenyl)-1,2,3,6-tetrahydropyrimidine-2-one with a melting point of 168° to 170°C. Analysis of this product yielded the following results:

|  |  | C(%) | H(%) | N(%) |
|---|---|---|---|---|
| $C_{17}H_{15}N_3O_3$ | Found: | 65.97 | 4.82 | 13.71 |
|  | Calculated: | 66.01 | 4.89 | 13.59 |

EXAMPLE 15

Part A

β-(o-Hydroxyanilino)-3,4,5-trimethyoxypropiophenone hydrochloride

5 G. of β-dimethylamino-3,4,5-trimethoxypropiophenone hydrochloride were added to 25 ml. of 50% aqueous, ethanol and stirring continued until all the phenone had dissolved. 2 g. of o-aminophenol were added and the solution refluxed for 0.5 hours, then set aside to cool. Thereafter, the solution was extracted twice with 10 ml. ethyl acetate, the organic extracts combined and an excess (3 mls.) concentrated hydrochloric acid added to the organic phase. The solution was set aside and after a short time β-(o-hydroxyanilino)-3,4,5-trimethoxypropiophenone hydrochloride crystallized out. This compound, recrystallized from a methanol-acetone mixture, had a melting point of 169° to 170°C.

Part B

1-(2'-hydroxyphenyl)-4-(3'',4'',5''-trimethoxyphenyl)-1,2,3,6-tetrahydropyrimidine-2-one

3 G. of β-(o-hydroxyanilino)-3,4,5-trimethoxypropiophenone hydrochloride prepared by the procedure of Part A were dissolved in 10 ml. of acetic acid at 60°C. 1.5 g. of potassium cyanate were added and, as usual, an exothermic reaction was noted. After cooling to room temperature, 20 mls. water were added, and the 1-2'-hydroxyphenyl)-4-(3''-bromophenyl)-1,2,3,6-tetrahydropyrimidine precipitated out of solution. The suspension was extracted twice with 10 mls. ethyl acetate. The organic extracts were combined and washed successively with 10% aqueous sodium hydroxide, 10% aqueous hydrochloric acid and water then dried over sodium sulfate, filtered and evaporated to dryness. The residue was recrystallized from an N,N-dimethylformamide-ethyl acetate mixture to give the desired 1-(2'-hydroxyphenyl)-4-(3'',4'',5''-trimethoxyphenyl)-1,2,3,6-tetrahydropyrimidine-2-one, which had a melting point of 224° to 226°C. Analysis of this product yielded the following results:

|  |  | C(%) | H(%) | N(%) |
|---|---|---|---|---|
| $C_{19}H_{20}N_2O_5$ | Found: | 63.94 | 5.79 | 8.02 |
|  | Calculated: | 64.03 | 5.56 | 7.86 |

EXAMPLE 16

Part A

β-(2-Naphthylamino)-m-nitropropiophenone hydrochloride

5 G. of β-dimethylamino-m-nitropropiophenone hydrochloride were added to 25 ml. of 50% aqueous ethanol and stirring continued until all the phenone had dissolved. 2.9 g. of 2-naphthylamine were added and the solution refluxed for 0.5 hours, then set aside to cool. Thereafter, the solution was extracted twice with 10 ml. ethyl acetate, the organic extracts combined and an excess (3 mls.) concentrated hydrochloric acid added to the organic phase. The solution was set aside and after a short time β-(2-naphtylamino)-m-nitropropiophenone hydrochloride crystallized out. This compound, recrystallized from a methanol-acetone mixture, had a melting point of 112° to 115°C.

Part B

1-(2-Naphthyl)-4-(3'-nitrophenyl)-1,2,3,6-tetrahydropyrimidine-2-one

2.5 G. of β-(2-naphthylamino)-m-nitropropiophenone hydrochloride prepared by the procedure of Part A were dissolved in 10 ml. of acetic acid at 60°C. 1.2 G. of potassium cyanate were added and, as usual, an exothermic reaction was noted. After cooling to room temperature, 20 mls. water were added, and the 1-(2'-hydroxyphenyl)-4-(3''-bromophenyl)-1,2,3,6-tetrahydropyrimidine precipitated out of solution. The suspension was extracted twice with 10 mls. ethyl acetate. The organic extracts were combined and washed successively with 10% aqueous sodium hydroxide, 10% aqueous hydrochloric acid and water then dried over sodium sulfate, filtered and evaporated to dryness. The residue was recrystallized from N,N-dimethylformamide to give the desired 1-(2-naphthyl)-4-(3'-nitrophenyl)-1,2,3,6-tetrahydropyrimidine-2-one, which had a melting point of 250° to 253°C. Analysis of this product yielded the following results:

|  |  | C(%) | H(%) | N(%) |
|---|---|---|---|---|
| $C_{20}H_{16}N_3O_3$ | Found: | 69.39 | 4.46 | 12.38 |
|  | Calculated: | 69.35 | 4.65 | 12.13 |

EXAMPLE 17

1-(2'-Acetoxyphenyl)-4-phenyl-1,2,3,6-tetrahydropyrimidine-2-one.

1 G. of 1-(2'-hydroxyphenyl)-4-phenyl-1,2,3,6-tetrahydropyrimidine-2-one prepared by the procedure of Example 2 hereinbefore was dissolved in 2 ml. of pyridine and 2 ml. of acetic anhydride were added to the solution. The reaction mixture was allowed to stand for 1 hour at ambient temperature (25°C.), then 5 ml. water were added when the desired 1-(2'-acetoxyphenyl)-4-phenyl-1,2,3,6 slowly precipitated out of solution in the form of white crystals. The ester, recrystallized from ethyl acetate, had a melting point of 172° to 175°C. Analysis of this product yielded the following results:

|  |  | C(%) | H(%) | N(%) |
|---|---|---|---|---|
| $C_{18}H_{16}N_2O_3$ | Found: | 70.45 | 5.25 | 9.03 |
|  | Calculated: | 70.11 | 5.23 | 9.08 |

EXAMPLE 18

1-(2'-Acetoxyphenyl)-4-(3''-nitrophenyl)-1,2,3,6-tetrahydropyrimidine-2-one.

1 G. of 1-(2'-hydroxyphenyl)-4-(3''-nitrophenyl)-1,2,3,6-tetrahydropyrimidine-3-one obtained by the procedure of Example I hereinbefore was dissolved in 2 ml. of pyridine and 2 ml. of acetic anhydride were added to the solution. The esterification reaction was conducted following exactly the same procedure as in the foregoing Example to give 0.7 g. of the desired 1-(2'-acetoxyphenyl)-4-(3''-nitrophenyl)-1,2,3,6-tetrahydropyrimidine-2-one. The compound recrystallized from a mixture of N,N-dimethylformamide and ethyl acetate had a melting point of 183° to 185°C. Analysis of this product yielded the following results:

| | | C(%) | H(%) | N(%) |
|---|---|---|---|---|
| $C_{18}H_{15}N_3O_2$ | Found: | 61.01 | 4.07 | 11.44 |
| | Calculated: | 61.19 | 4.28 | 11.61 |

EXAMPLE 19

1-(2'-Propoxyphenyl)-4-(3''-nitrophenyl)-1,2,3,6-tetrahydropyrimidine-2-one

1 G. of 1-(2'-hyrdoxyphenyl)-4-(3''-nitrophenyl)-1,2,3,6-tetrahydropyrimidine-3-one obtained by the procedure of Example I hereinbefore was dissolved in 2 ml. pyridine and 2 ml. propionic anhydride were added to the solution. The reaction was conducted following exactly the same procedure as in Example 17 to give 1-(2'-propoxyphenyl)-4-(3''-nitrophenyl)-1,2,3,6-tetrahydropyrimidine-2-one, which when recrystallized from an N,N-dimethylformamide-ethanol mixture had a metlting point of 192° to 193°C. Analysis of this product yielded the following results:

| | | C(%) | H(%) | N(%) |
|---|---|---|---|---|
| $C_{19}H_{17}N_3O_3$ | Found: | 62.39 | 4.86 | 11.68 |
| | Calculated: | 62.11 | 4.66 | 11.44 |

EXAMPLE 20

1-(2-Butyroxyphenyl)-4-(3''-nitrophenyl)-1,2,3,6-tetrahydropyrimidine-2-one

1 G. of 1-(2'-hydroxyphenyl)-4-(3''-nitrophenyl)-1,2,3,6-tetrahydropyrimidine-2-one obtained by the procedure of Example I hereinbefore was dissolved in 2 ml. of pyridine and 2 ml. butyric anhydride were added to the solution. The reaction was conducted following exactly the same procedure as in Example 17 to give 1-(2'-butyroxyphenyl)-4-(3''-nitrophenyl)-1,2,3,6-tetrahydropyrimidine, which when recrystallized from an N,N-dimethylformamide-ethanol mixture had a melting point of 178° to 180°C. Analysis of this product yielded the following results:

| | | C(%) | H(%) | N(%) |
|---|---|---|---|---|
| $C_{20}H_{19}N_3O_3$ | Found: | 63.12 | 5.23 | 11.20 |
| | Calculated: | 62.98 | 5.02 | 11.02 |

EXAMPLE 21

1-(2'-Undecylenoxyphenyl)-4-(3''-nitrophenyl)-1,2,3,6-tetrahydropyrimidine-2

2 G. of 1-(2'-hydroxyphenyl)-4-(3'-nitrophenyl)-1,2,3,6-tetrahydropyrimidine-2-one obtained by the procedure of Example I hereinbefore were dissolved in 4 ml. pyridine and 2 ml. of undecenoyl chloride were added to the solution. The reaction mixture was allowed to stand at ambient temperature overnight, after which 5 ml. of water were added. The solution was extracted with ethyl acetate and the organic solution washed successively with 10% aqueous sodium carbonate, water, 10% aqueous hydrochloric acid and water, dried over sodium sulfate, filtered across silica gel and concentrated by heating in vacuo. The concentrated solution was set aside when crystals of 1-(2'-undecylenoxyphenyl)-4-(3''-nitrophenyl)-1,2,3,6-tetrahydropyrimidine-3-one separated out. This ester, recrystallized from ethyl acetate, had a melting point of 116° to 120°C. Analysis of this product yielded the following results:

| | | C(%) | H(%) | N(%) |
|---|---|---|---|---|
| $C_{27}H_{31}N_3O_5$ | Found: | 67.76 | 6.46 | 8.30 |
| | Calculated: | 67.90 | 6.54 | 8.80 |

EXAMPLE 22

1-(2'-Benzoxyphenyl)-4-(3''-nitrophenyl)-1,2,3,6-tetrahydropyrimidine-2-one

1 G. of 1-(2'-hydroxyphenyl)-4-(3''-nitrophenyl)-1,2,3,6-tetrahydropyrimidine-2-one obtained by the procedure of Example I hereinbefore was dissolved in 2 ml. pyridine and 1 ml. benzoylchloride was added slowly to the solution. The reaction mixture was allowed to stand for 0.5 hours at room temperature after which 5 ml. of water were added and the reaction conducted following exactly the same procedure as in Example 21 to give 1-(2'-benzoxyphenyl)-4-(3''-nitrophenyl)-1,2,3,6-tetrahydropyrimidine-2-one. This ester recrystallized from ethyl acetate had a melting point of 205° to 206°C. Analysis of this product yielded the following results:

| | | C(%) | H(%) |
|---|---|---|---|
| $C_{23}H_{17}O_5N_3$ | Found: | 66.69 | 4.33 |
| | Calculated: | 66.49 | 4.12 |

EXAMPLE 23

1-(2'-(2-Ethylhexanolyoxy)-phenyl)-4-(3''-nitrophenyl)-1,2,3,6-tetrahydropyrimidine-2-one 1 G. of 1-(2'-hydroxyphenyl)-4-(3''-nitrophenyl)-1,2,3,6-tetrahydropyrimidine-2-one obtained by the procedure of Example I hereinbefore was dissolved in 2 ml. pyridine and 1 ml. of 2-ethylhexanoyl chloride was added to the solution. The reaction mixture was allowed to stand for 0.5 hours, after which 5 ml. water were added and the reaction conducted following exactly the same procedure as in Example 21 to give the 2-ethylhexanoic ester of the starting material. This ester recrystallized from ethyl acetate had a melting point of 152° to 153°C. Analysis of this product yielded the following results:

| | | C(%) | H(%) |
|---|---|---|---|
| $C_{24}H_{27}N_3O_5$ | Found: | 65.84 | 6.33 |
| | Calculated: | 65.88 | 6.22 |

EXAMPLE 24

1-(2-Isovaleroxyphenyl)-4-(3''-nitrophenyl)-1,2,3,6-tetrahydropyrimidine-2-one

1 G. of 1-(2'-hydroxyphenyl)-4-(3''-nitrophenyl)-1,2,3,6-tetrahydropyrimidine-2-one obtained by the procedure of Example I hereinbefore was dissolved in 2 ml. pyridine and 1 ml. of isovaleroylchloride was added to the solution. The reaction mixture was allowed to stand for 0.5 hours after which 5 ml. water were added and 2 ml. of a concentrated methanolic solution of barium hydroxide. The suspension was extracted with ethyl acetate and the organic solution dried over sodium sulfate and filtered through silica-gel. The filtrate was concentrated by heating in vacuo. The concentrated solution was set aside to cool when the desired 1-(2'-isovaleroxyphenyl)-4-(3''-nitrophenyl)-1,2,3,6-tetrahydropyrimidine-2-one precipitated out of solution. This ester had a melting point of 191° to 192°C. Analysis of this product yielded the following results:

|  |  | C(%) | H(%) |
|---|---|---|---|
| $C_{21}H_{22}N_3O_5$ | Found: | 63.67 | 5.50 |
|  | Calculated: | 63.78 | 5.35 |

EXAMPLE 25

1-(2'-ethoxycarboxyphenyl)-4-(3''-nitrophenyl)-1,2,3,6-tetrahydropyrimidine-2-one 1 G. of 1-(2'-hydroxyphenyl)-4-(3''-nitrophenyl)-1,2,3,6-tetrahydropyrimidine-2-one obtained by the procedure of Example I hereinbefore was dissolved in 2 ml. pyridine and 1 ml. of ethylchloroformate was added slowly to the solution. The reaction mixture was allowed to stand at room temperature for 0.5 hours after which water was added and the reaction conducted following exactly the procedure of Example 17 to give the ethylcarbonic ester of the starting material. This ester had a melting point of 193° to 195°C. Analysis of this product yielded the following results:

|  |  | C(%) | N(%) | H(%) |
|---|---|---|---|---|
| $C_{19}H_{17}O_6N_3$ | Found: | 59.87 | 4.45 | 11.21 |
|  | Calculated: | 59.52 | 4.47 | 11.44 |

EXAMPLE 26

1-(2'-Acetoxyphenyl)-4-(4''-nitrophenyl)-1,2,3,6-tetrahydropyrimidine-2-one

1 G. of 1-(2'-hydroxyphenyl-4-(4''-nitrophenyl)-1,2,3,6-tetrahydropyrimidine-2-one obtained by the procedure of Example 3 hereinbefore was dissolved in 2 ml. of pyridine and 2 ml. of acetic anhydride were added to the solution. The reaction was conducted following exactly the same procedure as in Example 17 to give 1-(2'-acetoxyphenyl)-4-(4''-nitrophenyl)-1,2,3,6-tetrahydropyrimidine-2-one, which when recrystallized from N,N-dimethylformamide-ethyl acetate had a melting point of 222° to 223°C. Analysis of this product yielded the following results:

|  |  | C(%) | N(%) | H(%) |
|---|---|---|---|---|
| $C_{18}H_{15}N_3O_5$ | Found: | 61.05 | 4.38 | 11.73 |
|  | Calculated: | 61.19 | 4.28 | 11.61 |

EXAMPLE 27

1-(2'-Benzoxyphenyl)-4-(4''-nitrophenyl)-1,2,3,6-tetrahydropyrimidine-2-one 1 g. of 1-(2'-hydroxyphenyl)-4-(4''-nitrophenyl)-1,2,3,6-tetrahydropyrimidine-2-one obtained by the procedure of Example 3 hereinbefore was dissolved in 2 ml. of pyridine and 2 ml. of benzoyl chloride were added to the solution. The reaction was conducted following exactly the same procedure as in Example 21 to give 1-(2'-benzoxyphenyl)-4-(4''-nitrophenyl)-1,2,3,6-tetrahydropyrimidine-2-one. This ester, when recrystallized from an N,N-dimethylformamideethyl acetate mixture had a melting point of 213° to 215°C. Analysis of this product yielded the following results:

|  |  | C(%) | H(%) | N(%) |
|---|---|---|---|---|
| $C_{23}H_{17}N_3O_5$ | Found: | 66.54 | 4.46 | 10.05 |
|  | Calculated: | 66.69 | 4.12 | 10.11 |

EXAMPLE 28

1-(2'-(3,4,5-trimethoxybenzoxy)-phenyl)-4-(4''-nitrophenyl)-1,2,3,6-tetrahydropyrimidine-2-one.

1 G. of 1-(2'-hydroxyphenyl)-4-(4''-nitrophenyl) 1,-2,3,6-tetrahydropyrimidine-2-one obtained by the procedure of Example 3 hereinbefore was dissolved in 2 ml. pyridine and 0.8 g. of 3,4,5-trimethoxybenzoylchloride was added to the solution. The reaction was conducted following exactly the same procedure as in Example 21 to give the 3,4,5 trimethoxybenzoyl ester of the starting compound. This ester had a melting point of 220° to 225°C. Analysis of this product yielded the following results:

|  |  | C(%) | H(%) | N(%) |
|---|---|---|---|---|
| $C_{26}H_{23}N_3O_8$ | Found: | 61.69 | 4.73 | 8.73 |
|  | Calculated: | 61.77 | 4.59 | 8.31 |

EXAMPLE 29

1-(2'-Acetoxyphenyl)-4-(3''-bromophenyl)-1,2,3,6-tetrahydropyrimidine-2-one

1 G. of 1-(2'-hydroxyphenyl)-4-(3''-bromophenyl)-1,2,3,6-tetrahydropyrimidine-2-one obtained by the procedure of Example 6 hereinbefore was dissolved in 2 ml. of pyridine and 2 ml. of acetic anhydride were added to the solution. The esterification reaction was conducted following exactly the same procedure as in Example 17 hereinbefore to give the desired 1-(2'-acetoxyphenyl)-4-(3''-bromophenyl)-1,2,3,6-tetrahydropyrimidine-2-one. The compound recrystallized from a mixture of N,N-dimethylformamide and ethyl acetate had a melting point of 173° to 175°C. Analysis of this product yielded the following results:

|  | | C(%) | H(%) | N(%) | Br(%) |
|---|---|---|---|---|---|
| $C_{18}H_{15}N_2O_3Br$ | Found | 55.62 | 4.24 | 7.00 | 20.55 |
| | Calculated | 55.83 | 3.91 | 7.23 | 20.63 |

EXAMPLE 30

1-(2'-Propoxyphenyl)-4-(3''-bromophenyl)-1,2,3,6-tetrahydropyrimidine-2-one

1 G. of 1-(2'-hydroxyphenyl)-4-(3''-bromophenyl)-1,2,3,6-tetrahydropyrimidine-3-one obtained by the procedure of Example 6 hereinbefore was dissolved in 2 ml. pyridine and 2 ml. propionic anhydride were added to the solution. The reaction was conducted following exactly the same procedure as in Example 17 to give 1-(2'-propoxyphenyl)-4-(3''-bromophenyl)-1,2,3,6-tetrahydropyrimidine-2-one, which when recrystallized from an N,N-dimethylformamide-ethanol mixture had a melting point of 182° to 185°C. Analysis of this product yielded the following results:

|  | | C(%) | H(%) | N(%) | Br(%) |
|---|---|---|---|---|---|
| $C_{19}H_{17}N_2O_3Br$ | Found | 56.74 | 4.01 | 7.41 | 20.50 |
| | Calculated | 56.87 | 4.27 | 6.98 | 19.92 |

EXAMPLE 31

1-(2'-(3,4,5-Trimethoxy)-benzoxy)-4-(3''-bromophenyl-1,2,3,6-tetrahydropyrimidine-2-one 1 G. of 1-(2'-hydroxyphenyl)-4-(4''-bromophenyl)-1,2,3,6-tetrahydropyrimidine-2-one obtained by the procedure of Example 6 hereinbefore was dissolved in 2 ml. pyridine and 0.8 g. of 2,3,5-trimethoxybenzoylchloride was added to the solution. The reaction was conducted following exactly the same procedure as in Example 21 to give the 3,4,5-trimethoxybenzoyl ester of the starting compound. This ester, recrystallized from an N,N-dimethylformamide-ethyl acetate mixture, had a melting point of 197° to 198°C. Analysis of this product yielded the following results:

|  | | C(%) | H(%) | N(%) | Br(%) |
|---|---|---|---|---|---|
| $C_{26}H_{23}N_2O_6Br$ | Found | 57.65 | 4.38 | 5.05 | 15.04 |
| | Calculated | 57.89 | 4.30 | 5.19 | 14.82 |

EXAMPLE 32

1-(2'-ethoxycarboxyphenyl)-4-(3''-bromophenyl)-1,2,3,6-tetrahydropyrimidine-2-one 1 G. of 1-(2'-hydroxyphenyl)-4-(3''-bromophenyl)-1,2,3,6-tetrahydropyrimidine-2-one obtained by the procedure of Example 6 hereinbefore was dissolved in 2 ml. pyridine and 1 ml. of ethylchloroformate was added dropwise to the solution. The reaction mixture was allowed to stand at room temperature for 0.5 hours after which water was added and the reaction conducted following exactly the procedure of Example 17 to give the ethylcarbonic ester of the starting material. This ester, recrystallized from an N,N-dimethylformamide-ethyl acetate mixture, had a melting point of 121° to 123°C. Analysis of this product yielded the following results:

|  | | C(%) | N(%) | H(%) | Br(%) |
|---|---|---|---|---|---|
| $C_{19}H_{17}O_4N_2Br$ | Found | 54.61 | 6.66 | 4.27 | 19.50 |
| | Calculated | 54.69 | 6.71 | 4.11 | 19.15 |

EXAMPLE 33

1-(2'-Acetoxyphenyl)-4-(3''-chlorophenyl)-1,2,3,6-tetrahydropyrimidine-2-one

1 G. of 1-(2'-hydroxyphenyl)-4-(3''-chlorophenyl)-1,2,3,6-tetrahydropyrimidine-2-one prepared by the procedure of Example 7 hereinbefore was dissolved in 2 ml. of pyridine and 2 ml. of acetic anhydride were added to the solution. The reaction mixture was allowed to stand for 1 hour at ambient temperature (25°C.), then 5 ml. water were added when the desired 1-(2'-acetoxyphenyl)-4-(3''-chlorophenyl)-1,2,3,6 slowly precipitated out of solution in the form of crystals. The ester, recrystallized from benzene, had a melting point of 152° to 154°C. Analysis of this product yielded the following results:

|  | | C(%) | H(%) | N(%) | Cl(%) |
|---|---|---|---|---|---|
| $C_{18}H_{15}N_2O_3Cl$ | Found | 63.25 | 4.58 | 8.27 | 10.60 |
| | Calculated | 63.06 | 4.43 | 8.18 | 10.34 |

EXAMPLE 34

1-(2'-Acetoxyphenyl)-4-(3''-iodophenyl)-1,2,3,6-tetrahydro-2-one

1 G. of 1-(2'-hydroxyphenyl)-4-(3''-iodophenyl)-1,2,3,6-tetrahydropyrimidine-2-one prepared by the procedure of Example 8 hereinbefore was dissolved in 2 ml. of pyridine and 2 ml. of acetic anhydride were added to the solution. The reaction mixture was allowed to stand for 1 hour at ambient temperature (25°C.), then 5 ml. water were added when the desired 1-(2'-acetoxyphenyl)-4-(3''-iodophenyl)-1,2,3,6 slowly precipitated out of solution in the form of crystals. The ester, recrystallized from ethyl acetate, had a melting point of 184° to 186°C. Analysis of this product yielded the following results:

|  | | C(%) | H(%) | N(%) | I(%) |
|---|---|---|---|---|---|
| $C_{18}H_{15}N_2O_3I$ | Found | 50.01 | 3.51 | 6.31 | 29.02 |
| | Calculated | 49.79 | 3.48 | 6.45 | 29.22 |

EXAMPLE 35

1-(2'-Propoxyphenyl)-4-(3''-iodophenyl)-1,2,3,6-tetrahydropyrimidine-2-one

1 G. of 1-(2'-hydroxyphenyl)-4-(3''-iodophenyl)-1,2,3,6tetrahydropyrimidine-3-one obtained by the procedure of Example 8 hereinbefore was dissolved in 2 ml. pyridine and 2 ml. propionic anhydride were added to the solution. The reaction was conducted following exactly the same procedure as in Example 17 to give 1-(2'-propoxyphenyl)-4-(3''-iodophenyl)-1,2,3,6-tetrahydropyrimidine-2-one, which when recrystallized from ethyl acetate had a melting point of 192° to 194°C. Analysis of this product yielded the following results:

|  | | C(%) | H(%) |
|---|---|---|---|
| $C_{19}H_{17}N_2O_3I$ | Found: | 50.40 | 3.94 |
| | Calculated: | 50.68 | 4.25 |

EXAMPLE 36

1-(2'-Acetoxyphenyl)-4-(3''-trifluoromethylphenyl)-1,2,3,6-tetrahydropyrimidine-2-one 1 G. of 1-(2'-hydroxyphenyl)-4-(3''-trifluromethyl)-1,2,3,6-tetrahydropyrimidine-2-one obtained by the procedure of Example 9 hereinbefore was dissolved in 2 ml. of pyridine and 2 ml. of acetic anhydride were added to the solution. The esterificiation reaction was conducted following exactly the same procedure as in Example 17 to give the desired 1-(2'-acetoxyphenyl)-4-(3''-trifluoromethylphenyl)-1,2,3,6-tetrahydropyrimidine-2-one. The compound recrystalized from ethyl acetate had a melting point of 159° to 161°C. Analysis of this product yielded the following results:

|  | | C(%) | H(%) | N(%) |
|---|---|---|---|---|
| $C_{19}H_{15}N_2O_3F_3$ | Found: | 61.28 | 4.16 | 7.44 |
| | Calculated | 60.64 | 4.01 | 7.45 |

Such methods of manufacture as have been described in the foregoing specific examples can, of course, be readily modified by one skilled in the art to produce any of the novel compounds encompassed by Formula I.

EXAMPLE 37

Tablets having the following composition were made up according to the procedure described below:
Formulation

| Ingredient | Content |
|---|---|
| 1-(2'-Hydroxyphenyl)-4-(3''-nitrophenyl)-1,2,3,6-tetrahydropyrimidine-2-one | grams 175 |
| Lactose | 502.25 |
| Starch | 122 |
| Dextrin (20% Solution) | q.s. |
| Stearic acid | 3.5 |
| Magnesium stearate | 1.75 |

Procedure

The tetrahydropyrimidine, lactose and starch were dried and passed through a sieve of aperture size 420μ. This mixture was then granulated with the 20% dextrin solution, sifted at aperture size 700μ, air-dried at room temperature overnight, and again sifted at aperture size 700μ. The dried granules were thoroughly mixed with the stearic acid and magnesium stearate as lubricating agents and thereafter compressed into 230 mg. scored tablets (each containing 50 mg. of the tetrahydropyrimidine compound) on a suitable tabletting die.

EXAMPLE 38

Capsules each having the following composition were made up according to the procedure described below.

Formulation

| Ingredient | Content |
|---|---|
| 1-Adamantyl-4-(3'-nitrophenyl)-1,2,3,6-tetrahydropyrimidine-2-one | 5 mg. |
| Lactose | 145 mg. |

Procedure

The 1-adamantyl-4-(3'-nitrophenyl)-1,2,3,6-tetrahydropyrimidine-2-one and the lactose were passed throug a U.S. No. 40 mesh sieve, mixed well together and filled into gelatin capsules so that each contained 150 mg. of mixed powder.

In the foregoing Examples 37 and 38, the 1-(2'-hydroxyphenyl)-4-(3''-nitrophenyl)-1,2,3,6-tetrahydropyrimidine-2-one and 1-adamantyl-4-(3'-nitrophenyl)-1,2,3,6-tetrahydropyrimidine-2-one may be wholly or partly replaced by another pharmacologically active compound of the invention.

The effectiveness and toxicity of typical compounds of this invention were determined by standard pharmacological tests used in neuropharmacological evaluation, such as observation of general awareness and mood, behaviour, reflexes, locomotion, posture, muscle tone, etc., of the experimental animals.

While the foregoing description refers to the preparation of certain illustrative tetrahydropyrimidine compounds and certain illustrative pharmaceutical compositions suitable for administering the novel compounds in therapeutic applications it will be understood that the invention is not to be limited thereto and that numerous modifications and variations may be made without departing from the spirit of the invention. It is also to be understood that the following claims are intended to cover all the generic and specific features of the invention which, as a matter of language, might be said to fall therebetween.

Having described our invention, what we claim as new and desire to secure by Letters Patent is:

1. A 1,2,3,6-tetrahydropyrimidine-2-one compound of the formula:

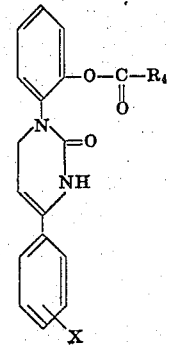

wherein X is in the 3- or 4-position and is selected from the group consisting of H, $NO_2$, $CF_3$ and halogen, and wherein $R_4$ is selected from the group consisting of alkyl having 1 to 7 carbon atoms, phenyl and 3,4,5-trimethoxyphenyl.

2. A compound as claimed in claim 1 which is 1-(2'-acetoxyphenyl)-4-(3''-nitrophenyl)-1,2,3,6-tetrahydropyrimidine-2-one.

3. A compound as claimed in claim 1 which is 1-(2'-benzoyloxyphenyl)-4-(3''-nitrophenyl)-1,2,3,6-tetrahydropyrimidine-2-one.

4. A compound as claimed in claim 1 which is 1-(2'-acetoxyphenyl)-4-(3''-bromophenyl)-1,2,3,6-tetrahydropyrimidine-2-one.

5. A 1,2,3,6-tetrahydropyrimidine-2-one compound of the formula:

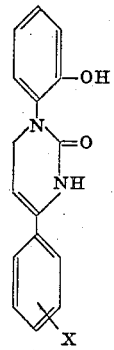

wherein X is in the 3- or 4-position and is selected from the group consisting of H, $NO_2$, $CF_3$ and halogen.

6. A 1,2,3,6-tetrahydropyrimidine-2-one compound of the formula:

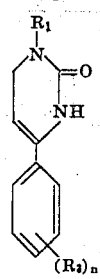

wherein n is one, wherein $R_3$ is in the 3-position and is selected from the group consisting of $NO_2$ and halogen, and wherein $R_1$ is lower alkyl having 1 to 5 carbon atoms, 1-adamantyl, 2-naphthyl, a monocyclic alkyl having 3 to 8 carbon atoms, bicyclo-[3.1.0]-hexane, bicyclo-[2.2.1]-heptane, and phenyl-lower alkyl, wherein the lower alkyl has 1 to 5 carbon atoms.

7. A compound as claimed in claim 6 which is 1-adamantyl-4-(3'-nitrophenyl)-1,2,3,6-tetrahydropyrimidine-2-one.

8. 1-(2'-ethoxycarboxyphenyl)-4-(3''-nitrophenyl)-1,2,3,6-tetrahydropyrimidine-2-one.

* * * * *